(12) United States Patent
Hong

(10) Patent No.: US 10,731,846 B2
(45) Date of Patent: Aug. 4, 2020

(54) BOILER FACILITY AND OPERATING METHOD THEREOF

(71) Applicant: GEESCO CO., LTD., Yong-si, Gyeonggi-do (KR)

(72) Inventor: Sung-Ho Hong, Seoul (KR)

(73) Assignee: GEESCO CO., LTD., Yong-si, Gyeonggi-do (KR)

( * ) Notice: Subject to any disclaimer, the term of this patent is extended or adjusted under 35 U.S.C. 154(b) by 0 days.

(21) Appl. No.: 16/331,721

(22) PCT Filed: Jul. 27, 2017

(86) PCT No.: PCT/KR2017/008089
§ 371 (c)(1),
(2) Date: Mar. 8, 2019

(87) PCT Pub. No.: WO2018/048096
PCT Pub. Date: Mar. 15, 2018

(65) Prior Publication Data
US 2019/0203927 A1    Jul. 4, 2019

(30) Foreign Application Priority Data
Sep. 9, 2016 (KR) .................. 10-2016-0116565

(51) Int. Cl.
*F22B 1/22* (2006.01)
*F23L 15/04* (2006.01)
(Continued)

(52) U.S. Cl.
CPC ............... *F22B 1/22* (2013.01); *F22B 35/00* (2013.01); *F22B 35/06* (2013.01); *F23L 15/04* (2013.01); *F23N 1/02* (2013.01); *Y02E 20/348* (2013.01)

(58) Field of Classification Search
CPC .. F22B 1/22; F22B 35/00; F22B 35/06; F23N 1/02; F23L 15/04; Y02E 20/348
(Continued)

(56) References Cited

U.S. PATENT DOCUMENTS 3,284,615 A * 11/1966 Yetter ..................... F23N 1/102
  700/28
3,957,418 A *  5/1976 Sata ........................ B01D 53/34
  431/9

(Continued)

FOREIGN PATENT DOCUMENTS

CN      1309261 A     8/2001
CN    102016416 A     4/2011
(Continued)

OTHER PUBLICATIONS

International Search Report from corresponding International Patent Application No. PCT/KR2017/008089 dated Nov. 29, 2017.
(Continued)

*Primary Examiner* — Hoang M Nguyen
(74) *Attorney, Agent, or Firm* — Crowe & Dunlevy, P.C.

(57) ABSTRACT

A boiler facility includes a boiler having a combustion chamber in which a burner is installed, a fuel pipe for supplying fuel to the burner, an air duct for supplying air sucked by a blower to the boiler, an oxygen supplier having an oxygen pipe connected to the air duct and a flow rate controller provided in the oxygen pipe, and a control unit. The control unit sets an air amount that is smaller than the reference air amount for burning the fuel, and controls the blower so that the set air amount is supplied to the boiler. Further, the control unit sets an oxygen amount for fuel combustion, and controls the flow rate controller so that the set oxygen amount is supplied to the air duct.

9 Claims, 2 Drawing Sheets

(51) Int. Cl.
*F23N 1/02* (2006.01)
*F22B 35/00* (2006.01)
*F22B 35/06* (2006.01)

(58) Field of Classification Search
USPC .......... 60/667; 110/185, 186, 188; 122/14.2, 122/14.21
See application file for complete search history.

(56) References Cited

U.S. PATENT DOCUMENTS

| | | | |
|---|---|---|---|
| 6,216,611 B1* | 4/2001 | Baudhuin | F23G 5/006 110/186 |
| 8,584,604 B2 | 11/2013 | Yamada et al. | |
| 8,601,960 B2 | 12/2013 | Terushita et al. | |
| 2001/0000863 A1* | 5/2001 | Marin | F23L 15/00 110/345 |
| 2008/0102411 A1* | 5/2008 | Longardner | F23N 3/00 431/2 |
| 2009/0272300 A1 | 11/2009 | Yamada et al. | |
| 2011/0045421 A1 | 2/2011 | Yamada et al. | |
| 2011/0132243 A1 | 6/2011 | Terushita et al. | |
| 2011/0197831 A1* | 8/2011 | Ohyatsu | G01F 1/712 122/6 R |
| 2015/0183650 A1 | 7/2015 | Younes et al. | |
| 2019/0016603 A1 | 1/2019 | Younes et al. | |

FOREIGN PATENT DOCUMENTS

| | | |
|---|---|---|
| CN | 102016419 A | 4/2011 |
| EP | 2261558 A1 | 12/2010 |
| EP | 2667093 A1 | 11/2013 |
| EP | 2959959 A1 | 12/2015 |
| JP | 2007147162 A | 6/2007 |
| JP | 2008175465 A | 7/2008 |
| JP | 2010243016 A | 10/2010 |
| JP | WO200911037 A1 | 7/2011 |
| JP | 2011247553 A | 12/2011 |
| JP | 5208195 B2 | 6/2013 |
| JP | 105849045 A | 8/2016 |
| KR | 101007513 B1 | 1/2011 |
| KR | 20120031375 A | 4/2012 |
| KR | 101237995 B1 | 2/2013 |
| KR | 101439883 B1 | 11/2014 |
| KR | 20160036683 A | 4/2016 |
| WO | 2007/061106 A1 | 5/2007 |

OTHER PUBLICATIONS

Nho, Dongsun, Industrial Oxy-Fuel Combustion Technology, ETIS (Energy Technology Information System), Jun. 2005, vol. 25, pp. 1-18.
Extended European Search Report (EESR) dated Mar. 10, 2020, of the corresponding European Patent Application No. 178489800.3.

* cited by examiner

BOILER FACILITY AND OPERATING METHOD THEREOF

TECHNICAL FIELD

The present invention relates to a boiler facility, and more particularly, to a boiler facility and an operation method thereof that are capable of optimally operating environmental facilities installed at the rear of a boiler.

BACKGROUND ART

Exhaust gas discharged from a boiler of a power generation facility contains pollutants such as nitrogen oxides (NOx), dust, and sulfur oxides (SOx). Therefore, boiler facilities are equipped with environmental facilities such as a denitration facility for removing nitrogen oxides, an electrostatic precipitator for removing dust, and a desulfurization facility for removing sulfur oxides, in the rear of the combustion chamber.

Recently, as environmental regulations have been strengthened, catalysts have been added to the denitration facility. In the electrostatic precipitator, a bag filter is additionally installed to enhance the collection efficiency by a hybrid method. In addition, in the desulfurization facility, the desulfurization efficiency has been increased by increasing the amount of limestone or increasing the volume of the reactor.

However, since the pressure loss of the boiler increases due to the addition of such environmental facilities, it is necessary to increase the capacity of the boiler blower or lower the load of the boiler. Moreover, since environmental facilities are degraded due to aging, the number of cases where the boiler is operated by lowering the load is increasing in order to comply with environmental regulations.

Recently, as the quality of coal has been lowered, the amount of air supplied to the boiler has been increased to increase the combustion efficiency of coal in the boiler. However, in this case, the amount of exhaust gas is increased, and it is difficult for environmental facilities to cope with the increased amount of exhaust gas. Therefore, there is a case where the load of the boiler is lowered to reduce the amount of exhaust gas.

On the other hand, there is a case where the power generation facility is operated with higher output than the design capacity of the boiler due to power shortage. In this case, damage to the environmental facilities is accelerated, and the boiler may suddenly stop due to damage to main equipment of the environmental facilities. Therefore, it is required to reduce the burden on the environmental facilities by suppressing an increase in the amount of exhaust gas of the boiler.

DISCLOSURE

Technical Problem

The present invention provides a boiler facility and its operation method capable of reducing the amount of exhaust gas of a boiler without causing a decrease in output of the boiler, thereby capable of optimally operating environmental facilities by reducing burden on environmental facilities.

Technical Solution

A boiler facility according to an embodiment of the present invention includes a boiler, a fuel pipe, an air duct, an oxygen supplier, and a control unit. The boiler includes a combustion chamber in which a burner is installed, and the fuel pipe supplies fuel to the burner. The air duct supplies air sucked by a blower to the boiler. The oxygen supplier includes an oxygen pipe connected to the air duct and a flow rate controller provided in the oxygen pipe, and increases an oxygen ratio in the air to be supplied to the boiler. The control unit sets an air amount that is smaller than a reference air amount for burning the fuel and an oxygen amount to be added to the air, and controls the blower and the flow rate controller according to the set air amount and the set oxygen amount. The set oxygen amount is any one of the amount of oxygen to be supplied to the boiler in which a total amount of exhaust gas discharged from the combustion chamber becomes equal to the amount of reference exhaust gas that is discharged when the reference air amount is supplied, and the amount of oxygen to be supplied to the boiler in which an output of the boiler becomes equal to an output that is generated when the reference air amount is supplied.

A heat exchanger may be installed in an exhaust gas duct at the rear end of the combustion chamber, and the air duct may be connected to the boiler via the heat exchanger. The heat exchanger may recover waste heat from the exhaust gas and heat the air in the air duct. The oxygen pipe may be connected to either the front end or the rear end of the heat exchanger in the air duct.

A method of operating a boiler facility according to an embodiment of the present invention includes two steps. In one step, a control unit sets a supply air amount to be supplied to the boiler in which the boiler discharges an exhaust gas amount that is smaller than a reference exhaust gas amount, and controls an output of a blower installed in an air duct to supply the set supply air amount to the boiler. In another step, the control unit sets an oxygen amount to be supplied to the boiler in which a total amount of exhaust gas becomes equal to the reference exhaust gas amount, and controls a flow rate controller provided in an oxygen pipe to further supply the set oxygen amount to the air duct.

A heat exchanger may be installed in an exhaust gas duct at the rear end of a combustion chamber, and the air duct may be connected to the boiler via the heat exchanger. The heat exchanger may recover the waste heat from the exhaust gas and heat the air to be supplied to the boiler. The oxygen pipe may be connected to the front end of the heat exchanger in the air duct, and the oxygen-added air may be heated in the heat exchanger.

A method of operating a boiler facility according to another embodiment of the present invention includes two steps. In one step, a control unit sets a supply air amount to be supplied to the boiler in which the boiler discharges an exhaust gas amount that is smaller than a reference exhaust gas amount, and controls an output of a blower installed in an air duct to supply the set supply air amount to the boiler. In another step, the control unit sets an oxygen amount to be supplied to the boiler in which an output of the boiler becomes equal to an output generated when a reference air amount is supplied, and controls a flow rate controller provided in an oxygen pipe to further supply the set oxygen amount to the air duct.

A heat exchanger may be installed in an exhaust gas duct at the rear end of a combustion chamber, and the air duct may be connected to the boiler via the heat exchanger. The heat exchanger may recover the waste heat from the exhaust gas and heat the air to be supplied to the boiler. The oxygen pipe may be connected to the front end of the heat exchanger in the air duct, and the oxygen-added air may be heated in the heat exchanger.

Advantageous Effects

According to one embodiment, the output of the boiler can be improved without increasing the amount of exhaust gas in the combustion chamber. In this case, power supply and demand can be smoothly performed without burdening environmental facilities. According to another embodiment, the amount of exhaust gas in the combustion chamber can be reduced while keeping the output of the boiler the same. In this case, the denitration efficiency of the denitration facility can be improved, deterioration of the performance of the catalyst can be suppressed, clogging of the gas re-heater can be prevented, and the desulfurization facility can be stably operated.

MODE FOR INVENTION

Hereinafter, exemplary embodiments of the present invention will be described in detail with reference to the accompanying drawings, which will be readily apparent to those skilled in the art to which the present invention pertains. The present invention may be embodied in many different forms and is not limited to the embodiments described herein.

Figure 1:
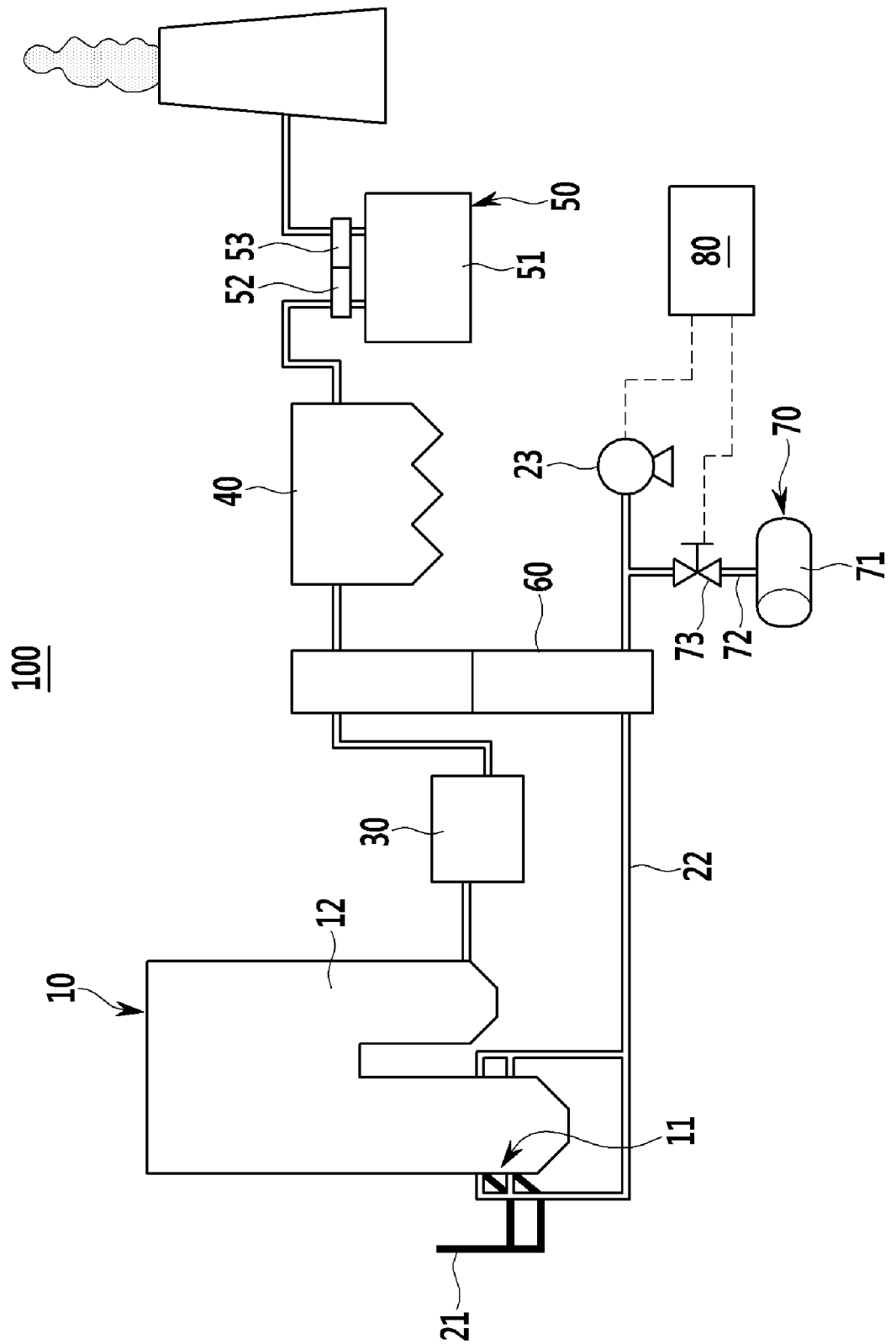
FIG. 1 is a configuration diagram of a boiler facility according to a first embodiment of the present invention.

FIG. 1 is a configuration diagram of a boiler facility according to a first embodiment of the present invention.

Referring to FIG. 1, a boiler facility 100 of the first embodiment includes a boiler 10 having a combustion chamber 12 in which a burner 11 is installed, and environmental facilities installed in the rear of the combustion chamber 12 to treat the exhaust gas of the combustion chamber 12. The fuel is supplied to the burner 11 through a fuel pipe 21, and air sucked by a blower 23 is supplied to the burner 11 and the combustion chamber 12 through an air duct 22.

The fuel of the boiler 10 may be a fossil fuel such as pulverized coal or heavy oil. When the fuel is pulverized coal, a pulverized coal burner may be used. The pulverized coal burner injects the pulverized coal and air into the combustion chamber 12, and the pulverized coal injected into the combustion chamber 12 is space-burnt in a floating state. The pulverized coal burner may be a low NOx burner with low NOx combustion.

The boiler 10 generates steam using the thermal energy of the combustion chamber 12, and the steam is supplied to a steam turbine (not shown). The exhaust gas discharged from the combustion chamber 12 contains pollutants, and the pollutants are reduced while the exhaust gases pass through the environmental facilities.

The environmental facilities may include a denitration facility 30 for removing nitrogen oxides (NOx), an electrostatic precipitator 40 for removing dust, and a desulfurization facility 50 for removing sulfur oxides (SOx). The exhaust gas from which pollutants have been removed through the denitration facility 30, the electrostatic precipitator 40, and the desulfurization facility 50 is discharged to the atmosphere through a chimney.

The denitration facility 30 may be configured as a selective catalytic reduction device. The selective catalytic reduction unit injects a reducing agent (ammonia, urea, etc.) into the exhaust gas to convert the nitrogen oxides to water and nitrogen on the catalyst. The reaction formula of the denitration facility 30 is as follows.

$$4NO + 4NH_3 + O_2 \rightarrow 4N_2 + 6H_2O$$

The electrostatic precipitator 40 is suitable for large-scale exhaust gas treatment, and a bag filter (not shown) may be additionally provided to enhance the dust collection efficiency in a hybrid manner. As the amount of exhaust gas passing through the denitration facility 30 increases, the denitration efficiency decreases and the catalyst wear phenomenon becomes worse. The efficiency of the electrostatic precipitator 40 also decreases as the exhaust gas amount increases.

A heat exchanger 60 may be installed in the exhaust gas duct between the denitration facility 30 and the electrostatic precipitator 40, and the air duct 22 may be connected to the boiler 10 via the heat exchanger 60. The heat exchanger 60 recovers waste heat from the exhaust gas to heat the air to be supplied to the boiler 10, thereby enhancing the combustion efficiency of the boiler 10. The heat exchanger 60 may be referred to as an air pre-heater.

The exhaust gas of the combustion chamber 12 contains a large amount of sulfur oxides due to combustion of sulfur in the fossil fuel. The desulfurization facility 50 can remove sulfur oxides by a wet process using limestone, and the reaction formula is as follows.

$$CaCO_3 + SO_2 + \tfrac{1}{2}H_2O \rightarrow CaSO_3 \cdot \tfrac{1}{2}H_2O + CO_2$$

In the desulfurization facility 50, the sulfur dioxide of the exhaust gas is neutralized by reaction with limestone and converted into gypsum, and the gypsum is recycled for industrial use. A circular mist eliminator 52 may be installed at the top of a reactor 51 of the desulfurization facility 50. The mist eliminator 52 prevents the gypsum slurry inside the reactor 51 from flowing out of the reactor 51.

If more exhaust gas than the design permissible amount of the mist eliminator 52 passes through the mist eliminator 52, the flow rate of the exhaust gas will exceed the designed critical flow rate of the mist eliminator 52, and a large amount of gypsum slurry may flow over a gas re-heater (or gas gas heater, GGH) 53 side installed at the rear of the reactor 51. In this case, the gas re-heater 53 is clogged by the gypsum slurry, and the clogging of the gas re-heater 53 leads to an increase in the pressure of the exhaust gas duct.

Further, since the function of the mist eliminator 52 is deteriorated as the use time is increased, the gypsum slurry is adhered on the circular edge and interferes with the passage of the exhaust gas. In this case, since the exhaust gas is concentrated at the central portion of the mist eliminator 52, the flow rate of the central portion of the mist eliminator 52 is increased, and the gypsum slurry may flow over the gas re-heater 53 side. At this time, if the amount of exhaust gas is reduced, it is possible to prevent the gypsum slurry from overflowing.

As described above, as the amount of exhaust gas of the boiler 10 increases, the efficiency of the denitration facility 30 and the electrostatic precipitator 40 becomes lower and an abnormality may occur in the desulfurization facility 50. When such a problem occurs, conventionally, a method of reducing the amount of exhaust gas by lowering the load of the boiler 10 has been dealt with. However, in this case, the output of the power generation facility is lowered.

The boiler facility 100 of the first embodiment includes an oxygen supplier 70 and a control unit 80. The oxygen supplier 70 may include an oxygen storage portion 71, an oxygen pipe 72 connecting the oxygen storage portion 71 and the air duct 22, and a flow rate controller 73 installed in the oxygen pipe 72. The oxygen supplier 70 can easily produce oxygen using liquid oxygen or an oxygen separation membrane.

The oxygen pipe 72 may be connected to the front of the heat exchanger 60 among all air ducts 22. In this case, the oxygen-added air is heated in the heat exchanger 60 and then supplied to the boiler 10.

The control unit 80 controls the blower 23 and the flow rate controller 73. Specifically, the control unit 80 sets an air amount that is smaller than a reference air amount for combustion of the fuel, and lowers the output of the blower 23 so that the set air amount is supplied to the boiler 10. At the same time, the control unit 80 sets an oxygen amount required for combustion, and controls the flow rate controller 73 to supply the set oxygen amount to the air duct 22. That is, the control unit 80 increases the oxygen ratio in the air instead of reducing the amount of air to be supplied to the boiler 10.

The reference air amount for combustion of the fuel is defined as the sum of a theoretical air amount for the combustion of the fuel and an excess air amount. The theoretical air amount is theoretically calculated according to the composition of the fuel to completely burn the fuel. However, if only the theoretical air amount is supplied, it is actually incomplete combustion. Therefore, in actual combustion, the excess air amount is added to the theoretical air amount to supply more air than the theoretical air amount.

The set air amount of the control unit 80 may be equal to or slightly larger than the theoretical air amount. That is, the control unit 80 may set the air amount to be supplied to the boiler 10 by subtracting the excess air amount from the reference air amount or reducing the excess air amount.

Even when the air amount supplied to the boiler 10 is reduced, since an appropriate amount of oxygen is supplied by the oxygen supplier 70, the combustion of the fuel is not hindered, and the amount of the exhaust gas discharged from the combustion chamber 12 is not increased. Further, since the flow rate of the exhaust gas is reduced in the denitration facility 30 or the desulfurization facility 50, the denitration efficiency or the desulfurization efficiency can be increased. In addition, a wear phenomenon of the denitration catalyst and clogging of the heat exchanger 60 and gas re-heater 53 can be effectively prevented.

The boiler facility 100 of the first embodiment can increase the output of the boiler 10 while maintaining the same amount of exhaust gas as that of supplying the reference air amount to the boiler 10. Alternatively, the boiler facility 100 of the first embodiment can reduce the amount of exhaust gas while maintaining the same output of the boiler 10 as when supplying the reference air amount to the boiler 10. The amount of exhaust gas discharged from the combustion chamber 12 is approximately 1.1 times the supply air amount.

Figure 2:
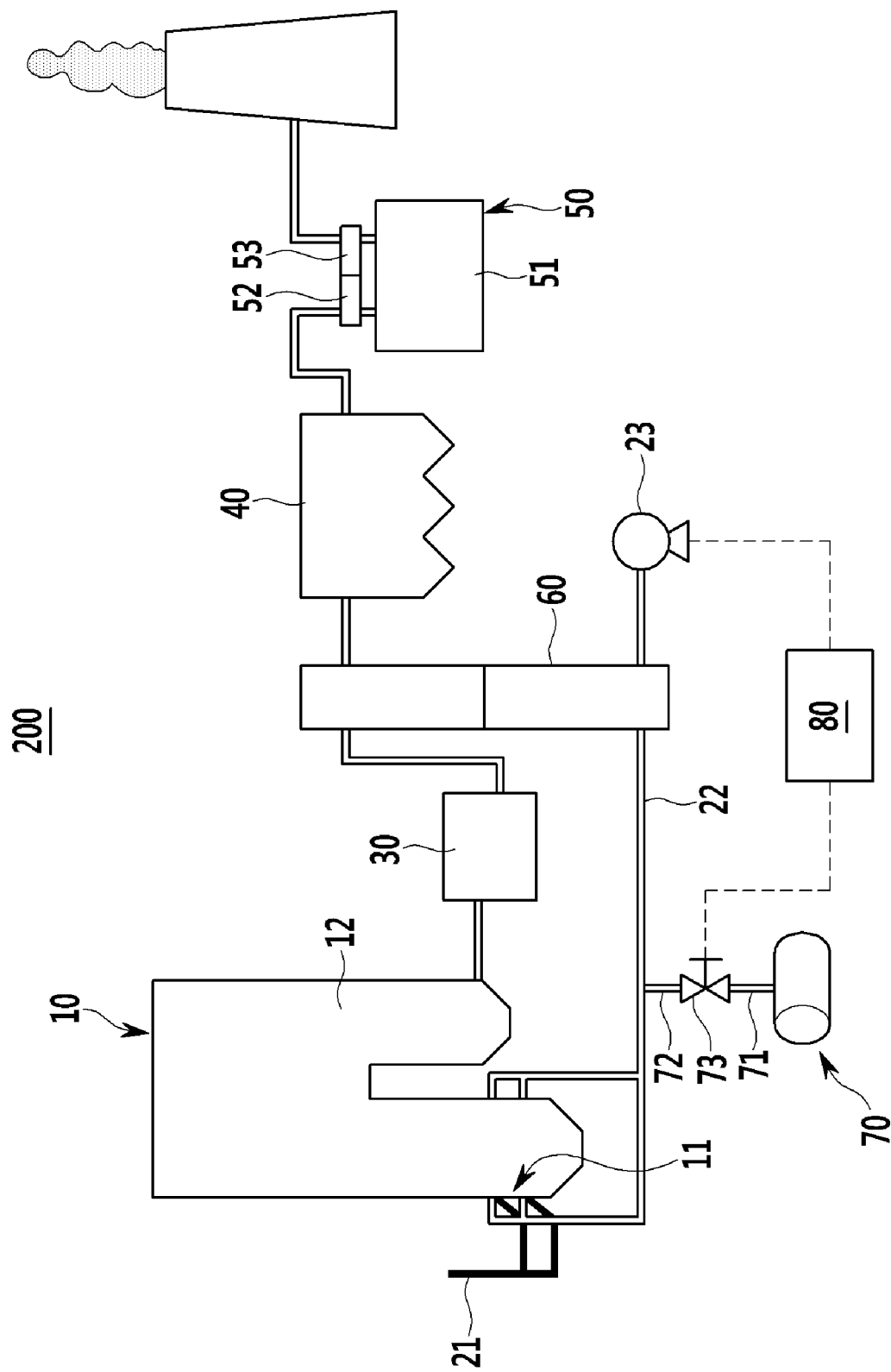
FIG. 2 is a configuration diagram of a boiler facility according to a second embodiment of the present invention.

FIG. 2 is a configuration diagram of a boiler facility according to a second embodiment of the present invention.

Referring to FIG. 2, in the boiler facility 200 of the second embodiment, the oxygen pipe 72 may be connected to the rear end of the heat exchanger 60 among all the air ducts 22. That is, the oxygen pipe 72 may be connected to the air duct 22 between the heat exchanger 60 and the boiler 10. In this case, only the air sucked by the blower 23 is heated while passing through the heat exchanger 60, and oxygen is directly supplied to the boiler 10. The boiler facility 200 of the second embodiment has the same configuration as that of the first embodiment except for the position of the oxygen supplier 70.

Next, a method of operating the boiler facility (100, 200) according to the first embodiment and the second embodiment will be described.

If the power supply and demand is difficult due to the cooling load in summer or the heating load in winter, the power generation facility can be operated to achieve higher output than rated power generation capacity. However, if there is no design margin in the boiler 10 and environmental facilities, damage or malfunction may occur in these facilities. In this case, the boiler facilities 100 and 200 are operated by increasing the output of the boiler 10 while maintaining the same amount of exhaust gas as that of supplying the reference air amount to the boiler 10.

For example, the amount of exhaust gas generated when the reference air amount is input in a 500 MW coal-fired power plant is normally 1,600,000 $Nm^3/h$ (referred to as "reference exhaust gas amount" for convenience). When the output of the boiler 10 is increased by 10%, the amount of exhaust gas also increases by approximately 10%, so that an enormous load is imposed on the environmental facilities installed rear of the combustion chamber 12.

In this case, the control unit 80 may set the air amount that discharges the exhaust gas amount (e.g., 1,557,468 $Nm^3/h$) to be smaller than the reference exhaust gas amount, and lowers the output of the blower 23 so that the set air amount may be supplied to the boiler 10. At the same time, the control unit 80 may set the oxygen amount (e.g., 60,760 kg/h) in which the total amount of exhaust gas becomes equal to the reference exhaust gas amount, and controls the flow rate controller 73 so that the set oxygen amount may be further supplied to the air duct 22.

The total amount of exhaust gas from the combustion chamber 12 is then 1,600,000 $Nm^3/h$, which can improve the boiler 10 output by approximately 10% while maintaining the design standards of the boiler 10. The oxygen ratio of the air increases from 21% to 23.1%. Since the exhaust gas amount is approximately 1.1 times the supply air amount, the control unit 80 may set the supply air amount corresponding to the target exhaust amount by using this relationship.

As another example, the control unit 80 may set the air amount that discharges the exhaust gas amount (e.g., 1,515,200 $Nm^3/h$) to be smaller than the reference exhaust gas amount, and lowers the output of the blower 23 so that the set air amount is supplied to the boiler 10. At the same time, the control unit 80 may set the oxygen amount (e.g., 121,440 kg/h) in which the total amount of exhaust gas becomes equal to the reference exhaust gas amount, and may control the flow rate controller 73 so that the set oxygen amount is further supplied to the air duct 22.

The total amount of exhaust gas from the combustion chamber 12 is then 1,600,000 $Nm^3/h$, which can improve the boiler 10 output by approximately 20% while maintaining the design standards of the boiler 10. The oxygen ratio of the air increase from 21% to 25%. It is known that when the oxygen ratio in the air is increased to 25%, the energy saving efficiency is about 30% or more, so the output of the boiler 10 is expected to actually increase by more than 20%.

According to the above-described method, the output of the boiler 10 can be increased without increasing the amount of exhaust gas. Therefore, it is possible to smoothen the supply and demand of electric power without burdening environmental facilities.

Next, as the operating time of the environmental facilities installed rear of the combustion chamber 12 increases, the performance of the catalyst may deteriorate due to deterioration or poisoning of the catalyst. In this case, the catalyst should be replaced or regenerated, but it is difficult to replace and regenerate the catalyst during operation. In addition, in order to comply with environmental regulations, it is most often operated by reducing the load of the boiler 10.

However, in this case, the output of the boiler 10 is inevitably lowered, and the catalyst of the denitration facility 30 tends to be poisoned more quickly due to the low temperature of the exhaust gas, so that the stable operation of the denitration facility 30 becomes difficult in the long term. In this case, the boiler facilities 100 and 200 are operated in such a manner that the amount of exhaust gas is reduced while maintaining the same output of the boiler 10 as in the case of supplying the reference air amount to the boiler 10.

For example, in a 500 MW coal-fired power plant, the control unit 80 may set the air amount that discharges about 1,360,000 $Nm^3/h$, which is 15% lower than the reference exhaust gas amount, and lowers the output of the blower 23 so that the set air amount may be supplied to the boiler 10. At this time, the control unit 80 may set the oxygen amount (e.g., 72,000 kg/h) in which the output of the boiler 10 becomes equal to the output that is generated when the reference air amount is input, and controls the flow rate controller 73 to further supply the set oxygen amount to the air duct 22.

The actual amount of exhaust gas is then 1,440,000 $Nm^3/h$, which is approximately 90% of the reference exhaust gas amount. The total amount of exhaust gas is reduced by approximately 10%, and the output of the boiler 10 can be kept the same.

When the amount of exhaust gas is reduced by about 10% in the general denitration facility 30, the denitration efficiency is increased by about 5%. As the supply air amount decreases, the amount of nitrogen oxides also decreases, so that the concentration of nitrogen oxides at the entrance of the denitration facility 30 is lowered. Further, since the exhaust gas amount decreases, the temperature of the exhaust gas discharged from the combustion chamber 12 rises. Therefore, since the inlet temperature of the denitration facility 30 rises, deterioration of the performance of the catalyst can be suppressed.

On the other hand, when the heat exchanger 60 installed rear of the denitration facility 30 is clogged by ammonium sulfate or the like, the pressure loss increases and the operation of the boiler 10 becomes difficult. However, when the amount of exhaust gas passing through these facilities is reduced by the above-described method, the denitration facility 30 can be operated without lowering the output of the boiler 10.

In addition, since the mist eliminator 52 is provided at the upper part of the reactor 51 of the desulfurization facility 50, the gypsum slurry from the reactor 51 is prevented from flowing to the gas re-heater 53 side. However, when partial clogging of the mist eliminator 52 occurs due to deterioration of the mist eliminator 52 or defects of the cleaning device, the flow rate of the exhaust gas may locally exceed the critical flow rate of the mist eliminator 52. In this case, since the gypsum slurry flows over the gas re-heater 53 side, clogging of the gas re-heater 53 can occur.

Even in this case, the amount of exhaust gas passing through the desulfurization facility 50 can be reduced without lowering the output of the boiler 10 by using the method of this embodiment. Then, the flow rate of the exhaust gas in the mist eliminator 52 can be kept below the design flow rate, and the gypsum slurry can be effectively prevented from overflowing the reactor 51.

While the present invention has been particularly shown and described with reference to exemplary embodiments thereof, it is to be understood that the invention is not limited to the disclosed exemplary embodiments, and that various changes and modifications may be made therein without departing from the scope of the appended claims.

The invention claimed is:

1. A boiler facility, comprising:
a boiler having a combustion chamber in which a burner is installed;
a fuel pipe for supplying fuel to the burner;
an air duct for supplying air sucked by a blower to the boiler;
an oxygen supplier including an oxygen pipe connected to the air duct and a flow rate controller provided in the oxygen pipe, to increase an oxygen ratio in the air supplied to the boiler; and
a control unit for setting an air amount that is smaller than a reference air amount for burning the fuel and an oxygen amount to be added to the air, and for controlling the blower and the flow rate controller according to the set air amount and the set oxygen amount, wherein
the set oxygen amount is any one of the amount of oxygen to be supplied to the boiler in which a total amount of exhaust gas discharged from the combustion chamber becomes equal to the amount of reference exhaust gas that is discharged when the reference air amount is supplied, and the amount of oxygen to be supplied to the boiler in which an output of the boiler becomes equal to an output that is generated when the reference air amount is supplied.

2. The boiler facility of claim 1, wherein
a heat exchanger is installed in an exhaust gas duct at the rear end of the combustion chamber, the air duct is connected to the boiler via the heat exchanger, and
the heat exchanger recovers waste heat from the exhaust gas and heats the air in the air duct.

3. The boiler facility of claim 2, wherein
the oxygen pipe is connected to either the front end or the rear end of the heat exchanger in the air duct.

4. A method of operating a boiler facility, the boiler facility including a boiler, a fuel pipe and an air duct connected to the boiler, an oxygen pipe connected to the air duct, and a control unit for controlling the supply of air and oxygen, comprising:
a step in which the control unit sets a supply air amount to be supplied to the boiler in which the boiler discharges an exhaust gas amount that is smaller than a reference exhaust gas amount, and controls an output of a blower installed in the air duct to supply the set supply air amount to the boiler; and
a step in which the control unit sets an oxygen amount to be supplied to the boiler in which a total amount of exhaust gas becomes equal to the reference exhaust gas amount, and controls a flow rate controller provided in the oxygen pipe to further supply the set oxygen amount to the air duct.

5. The method of claim 4, wherein
a heat exchanger is installed in an exhaust gas duct at the rear end of the combustion chamber, the air duct is connected to the boiler via the heat exchanger, and
the heat exchanger recovers waste heat from the exhaust gas and heats the air to be supplied to the boiler.

6. The method of claim 5, wherein
the oxygen pipe is connected to the front end of the heat exchanger in the air duct, and the oxygen-added air is heated in the heat exchanger.

7. A method of operating a boiler facility, the boiler facility including a boiler, a fuel pipe and an air duct connected to the boiler, an oxygen pipe connected to the air duct, and a control unit for controlling supply of air and oxygen, comprising:
  a step in which the control unit sets a supply air amount to be supplied to the boiler in which the boiler discharges an exhaust gas amount that is smaller than a reference exhaust gas amount, and controls an output of a blower installed in the air duct to supply the set supply air amount to the boiler; and
  a step in which the control unit sets an oxygen amount to be supplied to the boiler in which an output of the boiler becomes equal to an output generated when a reference air amount is supplied, and controls a flow rate controller provided in the oxygen pipe to further supply the set oxygen amount to the air duct.

8. The method of claim 7, wherein
a heat exchanger is installed in an exhaust gas duct at the rear end of the combustion chamber, the air duct is connected to the boiler via the heat exchanger, and
the heat exchanger recovers waste heat from the exhaust gas and heats the air to be supplied to the boiler.

9. The method of claim 8, wherein
the oxygen pipe is connected to the front end of the heat exchanger in the air duct, and the oxygen-added air is heated in the heat exchanger.

\* \* \* \* \*